United States Patent [19]
Holly

[11] 3,930,732
[45] Jan. 6, 1976

[54] DEVICE AND PROCESS FOR TESTING A LENS SYSTEM

[75] Inventor: Sandor Holly, Falls Church, Va.

[73] Assignee: Atlantic Research Corporation, Alexandria, Va.

[22] Filed: Nov. 22, 1974

[21] Appl. No.: 526,444

[52] U.S. Cl. .............. 356/107; 250/578; 356/109; 356/124; 356/128
[51] Int. Cl.² ................ G01B 9/00; G01B 15/00
[58] Field of Search ................ 356/124–128, 356/107, 109; 250/578; 331/94.5, DIG. 1

[56] References Cited
UNITED STATES PATENTS
2,878,722  3/1959  Hopkins et al. .............. 356/109
3,492,076  1/1970  Back .............................. 356/124

OTHER PUBLICATIONS
D. F. Horne, Optical Production Technology, Crane, Russak & Co., New York, 1972, pp. 363–382.

Primary Examiner—Siegfried H. Grimm
Attorney, Agent, or Firm—Martha L. Ross

[57] ABSTRACT

Device and process for testing the optical transfer function of a lens system which comprise employing as the object or target the laterally moving-fringe pattern produced by convergence of two monochromatic coherent-radiation beams of equal size and intensity and slightly different frequency. A second fringe pattern may be employed as the reference standard. Both the target and reference patterns can be varied simultaneously in spatial frequency or fringe period. The system and process can test both modulation transfer function and phase transfer function accurately at any monochromatic wavelength produced by an available coherent-radiation source to which the test lens system is transparent, e.g., ultraviolet or shorter, visible, and infrared or longer. When polarized monochromatic radiation is used, the invention can also be employed to determine the polarization characteristics of the lens. The system and process can also test chromatic aberration by successive use of different coherent monochromatic radiation wavelengths.

66 Claims, 5 Drawing Figures

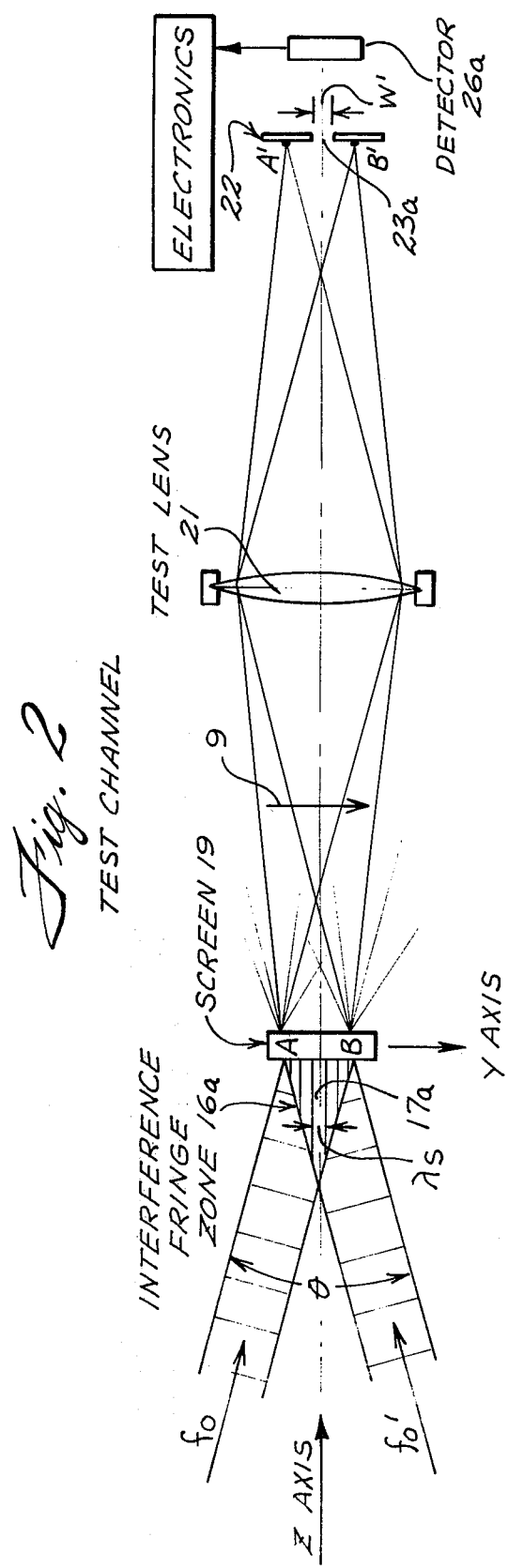
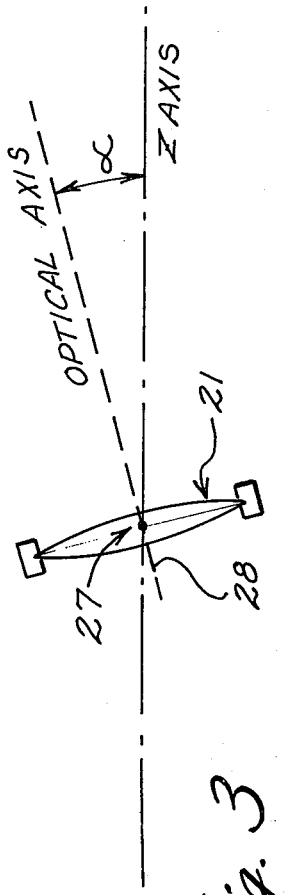

DEVICE AND PROCESS FOR TESTING A LENS SYSTEM

BACKGROUND OF THE INVENTION

Quality control or testing of a lens system to determine whether it is capable of functioning adequately within its design parameters is of great importance, particularly in the case of high performance lens systems, and is becoming increasingly important with the development of lens systems for highly sophisticated applications. Lens systems have been developed which require very high contrast in terms of lines/mm (modulation transfer function (MTF)), and minimum phase shift (phase transfer function (PTF)). Both MTF and PTF define the optical transfer function (OTF) of the lens. In many instances, particularly in the case of lens systems with high refractive index elements and low F number, it is also important to determine the polarization characteristics of the lens.

The prior art has developed a limited number of practical systems for testing the MTF of a lens, which employ a blackbody or monochromatic incoherent light source and a physical object or target device, such as a grating having parallel lines of fixed spatial frequency employed in conjunction with a narrow slit. By rotating the grating relative to the spatially fixed object slit, spatial frequency can be changed within limits. To extend the range of test spatial frequencies, the grating or relay optics must be changed. A second slit positioned in the image plane at right angles to the object slit provides a small rectangular scanning aperture for the transmitted modulated light. It should be noted that this cumbersome means of generating different spatial frequencies also generates a continuously changing pattern shape of the target with related distortions. Except for the most complex and expensive system presently available, PTF cannot be effectively measured and, in the exception, can be measured only within a minimum error of 5 percent. For a detailed description of the present state-of-the-art in OTF testing, see D. F. Horne, *Optical Production Technology*, Crane, Russak & Co., New York, 1972, pp. 363–382.

Other disadvantages of the prior art systems include the following:

They operate practically only in the visible optical wavelength range -- a serious problem for the rapidly developing and important art in infrared and ultra violet optics.

The normalized or absolute amplitude level, which is obtainable only at zero cycles per second of spatial frequency, is difficult to obtain with a desired degree of accuracy. Normalization error as low as 1 percent appears to be attainable only with the most highly complex and expensive monitoring systems presently available. Failure to normalize the MTF curve accurately at zero results in considerable scaling error of the curve at all points.

The characteristic generation of a one-dimensional line pattern or array of dark and light zones, e.g., along the $y$-axis, tends to introduce distortions in comparision with the two-dimensional array in the $x$ and $y$ directions produced by the test lens in actual use.

The present prior art systems also do not determine the polarization characteristics of the lens.

The present invention employs a laser interferometer system capable of producing, by convergence of two coherent-radiation beams of equal size and intensity and of slightly different frequency $f_0$ and $f_{01}$, the $\Delta f$ of which is in the radio frequency range, a laterally-moving-fringe pattern. The generation of laser interferometer fringe patterns and their use in sensing particle velocity and size in a moving fluid medium by separating the AC and DC signal components of the radiation scattered by the particles and determining contrast from the AC/DC ratios, are disclosed in detail in the following articles: (1) W. M. Farmer, "Measurement of Particle Size, Number Density and Velocity Using a Laser Interferometer," Applied Optics, Vol. 11, No. 11, Nov. 1972, pp. 2603–2612; (2) W. M. Farmer et al, "Two-Component, Self-Aligning Laser Vector Velocimeter," Applied Optics, Vol. 12, No. 11, Nov. 1973, pp. 2636–2640; and (3) W. M. Farmer, "Observations of Large Particles With a Laser Interferometer," Applied Optics, Vol. 13, No. 3, March 1974, pp. 610–622.

The laser interferometer systems, as disclosed by the prior art and particularly the laterally-moving-fringe pattern system described by Farmer (3) supra, is employed as a basic element of the present apparatus and process with additions and modifications essential to accomplish the purposes of the invention. An appropriately positioned beam splitter is positioned downstream of the initial laser beam splitter, to divide the original $f_o$ and $f_{o'}$ beams into two sets of $f_o$ and $f_{o'}$ beams of the same size and intensity, with one set functioning as the test channel and the other as the reference channel. Each beam set is converged to form first and second spatially separated, laterally moving-fringe patterns. The first functions in the object plane of the test lens as the test target and the second as the reference. The first test pattern is formed into a real image by an appropriate, radiation-scattering, imaging plate positioned across the fringe pattern of the object plane. The target light pattern formed on the real-imaging plate is then reimaged by the test lens system and analyzed through a first slit of appropriate size positioned in the image plane of the lens system being tested. The second reference fringe pattern is simultaneously analyzed through a second slit. The scattered radiation transmitted through the test and reference slits are each collected and separated into AC and DC signal components. The AC/DC ratios, which are a measure of contrast (MTF), are computed and compared with the aid of associated conventional electronics. The phase of the test and reference AC signal components are also electronically compared and any phase shift (PTF) is simultaneously determined.

Spatial period of the test fring-pattern target ($\lambda_s$) and reference ($\lambda''_s$) can be continuously or incrementally varied from infinity through a finite range determined by the design characteristics of the OTF measuring system and the design requirements of the test lens and its diffraction limits, simply by varying the angle of convergence $\theta$ of the $f_0$ and $f_{01}$ beams from zero through a predetermined degree of arc. The target pattern is always the same in shape except for the spatial frequency of the fringes, since the fringes are parallel to each other and to the plane defined by the $x$ and $z$ axes of the fringe planes. Although splitting of the initial laser beam into test and reference channels is the preferred embodiment, other means of providing the requisite reference can also be used.

The test lens can be rotated around its optical axis and turned around the nodal point in a fashion similar to that employed in present state-of-the-art techniques.

The advantages of the system of the present invention include but are not limited to the following:

The system can be employed to test optical systems in a $\lambda_o$ range from ultra violet or shorter through far infrared or longer by employing a laser source producing the required wavelength, optics, such as the Bragg cell, the converging lenses and real-image forming plate, which are transparent to the particular wavelength and detectors sensitive to the particular $\lambda_o$, all of which, with the possible exception of the real-image forming plate which at present would probably require custom fabrication, are conventionally available.

The test fringe target eliminates the cumbersome physical target means and means for generating different spatial frequencies presently employed and provides a more uniformly patterned and, therefore, less distorted target as spatial frequency is varied to determine OTF.

PTF can be determined within about 1 percent or less, a degree of accuracy which is not presently available. The use of a polarized radiation source makes it possible to test polarization characteristics of the lens system.

The fringe zone comprises a two-dimensional pattern in the plane of the $x$- and $y$- axis, which provides more accurate test readings in terms of actual performance of the test lens during use.

The normalized zero MT reading is obtained by a convergent angle equal to zero so that the $f_0$ and $f_{01}$ beams are coincident, thereby producing a fringe pattern having a fringe period of infinity. The resulting pattern is a single spot of radiation of uniform illumination at any given instant in time. The percentage of error is generally one percent or less, whereas such accuracy can only be obtained with the most sophisticated prior art equipment presently available.

Use of a moving fringe pattern as the target means provides both improved accuracy of the test pattern and an extended range of spatial frequency in terms of lines/mm by eliminating a mechanically produced target and by the dependence of the test pattern solely on the wavelength of the radiation source and the converging angle, so long as the converging beams are diffraction-limited by use of high quality optics.

System imperfections generally can be minimized or compensated because of the fewer optical components required, as compared with the present state-of-the-art systems and by the fact that, except for the real-imaging screen, all of the optical components can be paired in the test and reference channels and can be, therefore, compensated.

The system of the invention can also test the lens system at different levels of contrast of the object merely by changing the RF driver power of the initial laser beam-splitter, such as a Bragg cell. Measurement at different contrast levels is apparently not feasible with present prior art test equipment. The present invention, in addition to its versatility and its capability for accurately measuring both the MTF and PTF comprising the OTF of a lens system, as well as its polarization and chromatic aberration characteristics, has the advantage of relative simplicity, reduced number of optical components and reduced cost.

None of the available art, to the extent known, discloses the present invention. It will be understood that the terms "lens" or "lens system" (namely, the imaging system) as employed in this specification and claims encompasses a single lens, a plurality of adjacent lenses, or a lens or plurality of adjacent lenses associated with conventional electronic imaging tubes, such as image intensifiers, vidicon tubes, IR imaging tubes, image dissectors, and the like.

It will also be understood that the wavelengths $\lambda_o$ and $\lambda_{o'}$ corresponding to the split $f_o$ and $f_{o'}$ beams, are so minutely different in size that comparison of wavelength size to such elements as image slit size or scattering-center size refers to both $\lambda_o$ and $\lambda_{o'}$ and in this context the terms $\lambda_o$ and $\lambda_{o'}$ are interchangeable.

SUMMARY

The invention broadly relates to a process and apparatus for testing a lens system, including its OTF in terms of both its MTF and PTF; its polarization characteristics; and its refraction of different radiation wavelengths (chromatic aberration). The test system of the invention can be employed at any radiation wavelength produced by an available source of monochromatic, coherent radiation, such as a laser, for which transparent optical components are also available.

I. THE OPTICAL TEST SYSTEM

In general the invention comprises the following features:

1. Providing a laser source capable of producing radiation at a wavelength $\lambda_o$ suitable for the test lens system, e.g., UV, visible, or IR. If the polarization characteristics of the lens is also to be tested, a polarized laser source is used.

2. Dividing the coherent laser beam into two coherent beams of equal size and intensity and slightly different frequency $f_o$ and $f_{o'}$, the difference $\Delta f$ being within the radio frequency band. Such shifting of the frequency of one of the beams can, for example, be produced by diffraction of an incident laser beam by means of an ultrasonic Bragg cell, which can be made to divide the incident beam into two diverging beam components of equal size and intensity, one being a nondiffracted beam having the incident beam frequency and the other being a diffracted component having its frequency shifted by an amount equal to the Bragg cell frequency. $\Delta f$ is equal to the Bragg cell frequency produced by its RF power driver, which can be changed if desired to produce a different Bragg cell frequency and $\Delta f$.

3. Dividing equally the aforedescribed initial pair of $f_o$ and $f_{o'}$ beams into a first and a second pair of $f_o$ and $f_{o'}$ beams with the pairs moving spatially in different directions. The first pair is employed in the test channel and the second pair in the reference channel. Equal division into the first and second pairs of $f_o$ and $f_{o1}$ beams can be accomplished by conventional means, such as a high quality beam-splitter which reflects and transmits half of the incident radiation without change in the angle of reflection or transmission of the incident $f_o$ and $f_{o'}$ beams, and which for convenience will be called the second beam splitter. For maximum range of performance in terms of range of line density (lines/mm) it is desirable to provide an optical system between the initial or first beam splitter (e.g., Bragg cell) and the second beam splitter, which is capable of first further diverging the initial diverging $f_o$ and $f_{o1}$ beams and then converging them to focus in the plane of the beam splitter in such manner that both the test $f_o$-$f_{o'}$ beam pair and the reference $f_o$-$f_{o'}$ beam pair emerge from the beam splitter at a desired beam pair angle, which can equal zero or a divergent finite angle and the maximum size of which is determined by the performance parameters of the aforesaid optical system. It should be noted that the aforedescribed division of the laser beam into test and reference channels is the preferred embodiment because of its convenience and accuracy in establishing a comparison standard. However, it should be understood that the reference channel as aforedescribed is optional and can be replaced by other reference channel means, such as electronic means activated by other components of the test system, e.g., the Bragg cell driver and/or the optical element positioned in the initial $f_o$–$f_{o'}$ beam pair for changing $\theta$. Such other reference channel means are designed, with the use of conventional electronics, to produce an AC/DC signal ratio, which is essentially a measure of and, therefore, essentially the equivalent of the AC/DC signal ratio producible by the fringe pattern formed in the object plane of the test channel.

4. By means of suitable conventional optics, such as convex lenses positioned downstream of the second beam splitter, the first test $f_o$ and $f_{o'}$ beam pair and the second reference $f_o$ and $f_{o'}$ beam pair are converged respectively through angle $\theta$ and $\theta''$ to form first and second laterally-moving fringe patterns, the first fringe pattern being formed in the object plane of the test lens. It will be understood that angles $\theta$ and $\theta''$ can be equal to or different from each other and can equal zero as well as finite convergent angles. In the case where $\theta$ and $\theta''$ equal zero, the first and second $f_o$ and $f_{o'}$ beam pairs are superimposed or coincident when they leave the second beam splitter.

Within the volume of convergence of the two $f_o$ and $f_{o'}$ beams, an interference fringe pattern zone is formed in which the fringe pattern continuously moves laterally in the y-axis direction at a rate equal to $\Delta f$; the fringe planes lie parallel to the plane defined by the $x$ and $z$ axes; and the spatial frequency and fringe period $\lambda_s$ and $\lambda''_s$ respectively of the test and reference fringes are determined by converging angles $\theta$ and $\theta''$ and the wavelength $\lambda_o$ of the radiation in accordance with the following relationship:

$$\lambda_s = \frac{\lambda_o}{2 \sin(\theta/2)} \text{ and } \lambda_s'' = \frac{\lambda_o}{2 \sin(\theta''/2)}$$

It is obvious, therefore, that the size of the fringe period can be varied by varying either or both $\lambda_o$ and the angle of convergence. In general, it is easier and less cumbersome to vary the angle of convergence rather than $\lambda_o$. It should be noted that since the test and reference channels employ converging beam pairs $f_o$ and $f_{o'}$ of equal size and intensity, the angle of convergence $\theta''$ and resulting $\lambda''_s$ in the reference channel can be the same or different from $\theta$ and $\lambda_s$ forming the real-image fringe pattern in the test channel without changing equivalent AC/DC ratios.

In the case where $\theta$ and $\theta''$ equal zero and $\lambda_s$ and $\lambda''_s$ therefore equal $\infty$, the laterally moving fringe pattern becomes a spot of radiation which is uniformly illuminated within the gaussian envelope at any given instant in time and which, as in the case also of the finitely spaced fringes, varies sinusoidally in intensity at a rate equal to $\Delta f$. The time of a complete 360° phase cycle equals $1/\Delta f$. Spatial distribution of the radiation is gaussian in intensity in both the $x$ and $y$ directions and provides a two-dimensional light intensity distribution which can be collected and measured by detection optics and electronics.

The spatial frequency of the fringe pattern can be varied over a very wide range from zero cycles/mm (fringe period = $\infty$) to a finite value in terms of lines/mm 1/fringe period, which is determined by the design characteristics of the OTF measuring system. The readings taken at zero cycles/mm provide the information necessary for proper normalization of the MTF curve within a high degree of accuracy, generally within about 1 percent or better.

It will be understood that the term "fringe pattern" as used herein in the specification and claims includes both the pattern wherein the fringe period = $\infty$ and a finite dimension.

5. The variation in convergent angle to provide the desired changes in spatial frequency of the test and reference fringe patterns can be accomplished by conventional optics, such as a double-sided mirror, which can be used as the means for changing the angle over a range from zero to a desired finite angle to provide a line density, within diffraction limits, dictated by the design specification of the particular test lens, by being turned around its x-axis.

Additional change in convergent angle can be achieved by shifting the lenses employed to converge the first test and second reference $f_o$–$f_{o'}$ beam pairs longitudinally along the z-axis in either direction. The degree of shift can be the same or different to produce angle $\theta$ in the test channel and angle $\theta''$ in the reference channel.

6. The test fringe pattern is formed into a real-image target in the object plane as, for example, by means of a flat plate which is positioned across the fringe pattern in the $x$ –$y$ plane, has radiation-scattering centers on its downstream surface, and is made of material transparent to the wavelength of the coherent radiation.

The flat-plate, real-image former can have scattering centers produced in any suitable manner, as, for example, by pitting of the surface as in the case of ground glass, or by application of a thin layer of small, preferably uniformly-sized glass beads, which are made an integral, partially protruding part of the surface. The latter can be produced, for example, by heat-softening the surface of a glass plate, applying a thin layer of glass beads which have a higher softening point, and then cooling.

The scattering centers can be randomly distributed so long as they are in the form of a homogeneous layer of substantially uniform density. The average mean width $d_s$ and depth $h_s$ of the scattering centers are important to preserve the high contrast of the fringe pattern target. In general, it is desirable that the mean deviation in average width and depth over the surface of the plate be less than about 10 percent. The average means width $d_s$ is preferably at least about 0.1 $\lambda_s$ or smaller, $\lambda_s$ being the smallest fringe period employed in the given test, and not less than 0.05 $\lambda_o$ or larger:
$$0.05 \lambda_o \quad d_s \quad 0.1 \lambda_s$$
the preferred relationship being:
$$0.05 \lambda_o < d_s < 0.1 \lambda_s$$
The average mean depth $h_s$ preferably is within the following relationship:
$$d_s \quad h_s \quad 0.1 \lambda_s$$
the preferred relationship being:
$$d_s < h_s < 0.1 \lambda_s$$
Since the real-imaging screen should maintain the contrast and phase of the fringe pattern as closely as possible and is the only optical element not duplicated and, therefore, not compensated for in the reference channel, it is important to ensure that this element be of very high quality. However, some predetermined deterioration of fringe pattern properties, such as a decrease in intensity caused by absorption or reflection, can be compensated for by appropriate electronics.

7. The lens system under test is positioned downstream of the object plane, at a distance consonant with its design characteristics, in such manner that the bisector of the convergent angle $\theta$ passes through the nodal point of the test lens system or, additionally, in certain facets of the test procedure, through the optical axis of the test lens system. The test lens reimages the fringe pattern in the image plane of the test lens.

The size of the reimaged fringe pattern relative to the size of the real-image fringe pattern is, of course, determined by the test lens magnification. Thus, it can be smaller, equal to, or larger than the real-image pattern. At test lens magnifications other than unity, the fringe period of the imaged pattern in the image plane is also changed proportionately to the change in image size in the following relationship:

$$\lambda'_s = M \lambda_s$$

where $M$ is the magnification of the test lens; $\lambda'_s$ is the fringe period of the reimaged fringe pattern; and $\lambda_s$ is the fringe period of the real-image test fringe pattern and the reference channel fringe pattern. At a magnification of unity, it is obvious that $\lambda'_s = \lambda_s$.

8. Measurement of the MTF and PTF of the test lens is accomplished by means of a narrow slit positioned in the moving-fringe pattern image in the image plane in such manner that:

a. its longitudinal axis is parallel to the fringe plane, namely the plane defined by the $x$ and $z$ axes, and b. the plane of the optical slit and associated slitted plate lies across the image pattern in the $x$–$y$ plane. Preferably, though not essentially, the slit is positioned so that the optical axis of the system (colinear with the bisector), as extended through the lens under test, passes through the slit.

Slit width is an important parameter. If too narrow, it can create excessive diffraction and light loss to the detector. If too wide, it can alter the contrast readings by inclusion of the slit MTF as well as the lens MTF. In general, slit width $W'$ of the test slit should be substantially narrower than $\lambda'_s$ and substantially wider than $\lambda_o$, preferably within the following relationships, where $\lambda'_s$ is the smallest test image fringe period obtained in the given test:

$$2 \lambda_o \quad W' \quad 0.5 \lambda'_s$$

the preferred relationship being:

$$2 \lambda_o < W' << 0.5 \lambda'_s$$

Preferably $W'$ is larger than $3 \lambda_o$.

It will be seen from the foregoing relationship that the resolution of the maximum spatial frequency by means of the present invention is primarily limited by the wavelength of the laser radiation, the shorter the wavelength, the greater being the resolution.

For example, in the case of a HeNe laser producing a wavelength of $0.63\mu$ in the red portion of the visible spectrum, and employing the relationship:

$$2 \lambda_o = W' = 0.5 \lambda'_s,$$

then $$1.26\mu = W' = 0.5 \lambda'_s$$
$$\lambda'_s = 2.5\mu,$$

and the maximum spatial frequency which can be achieved while simultaneously satisfying the above condition is 400 l/mm.

Using the relationship $$3\lambda_o = W' = 0.5 \lambda'_s,$$

then $$1.89\mu = W' = 0.5 \lambda'_s$$
$$\lambda'_s = 3.8\mu,$$

in which case the maximum spatial frequency achievable is 263 l/mm.

In the case of $\lambda_o = 0.4\mu$ in the violet end of the visible spectrum:

$$2\lambda_o = W' = 0.5\lambda'_s,$$

then $$0.8\mu = W' = 0.5\lambda'_s,$$
$$\lambda'_s = 1.6\mu$$

in which case the maximum spatial frequency achievable is 625 l/mm.

Using the relationship:

$$3\lambda_o = W' = 0.5\lambda'_s,$$

then $$1.2\mu = W' = 0.5\lambda'_s,$$
$$\lambda'_s = 2.4\mu$$

in which case the maximum spatial frequency achievable is 416 l/mm.

The slit width is preferably adjustable so that it can be varied as required for a particular test, including such parameters as particular test lens magnification.

9. The radiation transmitted by the slit is collected by a sensitive detector, such as a photomultiplier tube (PMT) and, with the aid of conventional associated electronics, is separated into the AC and DC signal components. Its modulation depth or contrast is then determined by the AC/DC ratio. The test AC/DC ratios are compared with the reference AC/DC ratios, thereby providing a measurement of any degradation of contrast produced by the test lens. The associated electronics can also be used to compare the phase of the AC signal of the test lens with that produced by the reference channel to determine the phase errors introduced by the test lens within a high degree of accuracy.

10. The reference channel, as aforedescribed, consists of a pair of $f_o$ and $f_{o'}$, beams and converging optics. Convergence of the $f_o$ and $f_{o'}$ beams produces a moving-fringe pattern. Measurement of the AC/DC signal ratio produced by the reference fringe pattern is essentially the same as that which would be obtained from the test channel fringe in the object plane if it were measured at that position in the test channel system. To obtain the reference AC/DC signal ratio, a slit is positioned in the reference fringe pattern in the same way as the test slit is positioned in the pattern image in the image plane of the test channel. The reference slit should have a width $W''$ relative to the radiation frequency and the fringe period within relationships similar to those defined in I(8) supra, namely:

$$2 \lambda_o \quad W'' \quad 0.5 \lambda''_s$$

preferably:

$$2 \lambda_o < W'' << 0.5 \lambda''_s$$

wherein $\lambda''_s$ is the smallest reference fringe period obtained in the given test. Preferably $W''$ is larger than $3 \lambda_o$. Associated electronics, similar to those employed with the test channel, separate the signal in the collected radiation transmitted by the reference slit into AC and DC signal components and determine the AC/DC ratios and the phase of the reference AC signal. As aforedescribed, these are compared with the test AC/DC ratios and phase of the test AC signal.

11. Polarization characteristics of the test lens can be determined simply by rotating the polarization plane of polarized laser beams around the $z$-axis to a predetermined angle between 0° and 180°, preferably including at least one test scanning at 90°, with the test lens in its on-axis and/or off/axis position. One example of a situation where a polarization scan is very useful is in the case of a lens found to have an unacceptable degree of angular asymmetry. The polarization scan can determine an orientation of the lens which would give improved performance. Rotation of the polarization plane can be accomplished by any conventional means such as rotating the laser.

12. In the case of high-performance lens systems which must meet particularly exacting requirements, the following additional tests can be performed in an off-axis position of the test lens: o a. The test and reference fringe patterns can be rotated around the z-axis to a predetermined angle between 0° and 180°, preferably including at least one scanning at 90°, with the test lens in at least one off-axis position. This test procedure provides a determination of the test lens resolution for two orthogonal patterns of variable frequency. The test requires rotation of both the test and reference slits through the same predetermined angle as the fringe patterns so that they remain in the same relative positions in the fringe patterns. Rotation of the fringe patterns can readily be accomplished by use of conventional optical rotation means at a convenient position in the $f_0$ and $f_{o1}$ beams transmission system. In general, it is preferably positioned downstream of the beam splitter that is used to separate the test and reference channel beam pairs.

b. A polarization scan can be performed as described in section I (11) supra with the fringe patterns in the rotated position described in I(12)(a).

13. Chromatic aberration can be determined by repeating the aforedescribed procedures at at least two different wavelengths, which can be provided by different laser sources or by the same laser source if it produces different wavelengths separable by conventional means. The different radiation wavelengths employed should be within the operative wavelengh range of the optical components of the testing system and the test lens.

In summary, from the foregoing description, it is apparent that the use of a test target and a reference target comprising moving-fringe patterns in accordance with the invention, provides a test system having many important advantages over present prior art systems, including great versatility; improved accuracy; extension of the range and types of tests that can be accomplished with a given system without component change; and extension of the wavelength range of testing simply by replacement of the laser source or selection of a different wavelength produced by the same laser source and possible replacement of other components which require matching to the different $\lambda_o$, such as the first and second beam splitters, the converging lenses, the real-image-forming plate, and the test and reference detector optics. The front-coated mirror optics in the system do not require replacement. It should be noted that the substitutions are essential only for a change of test lens wavelength from within a given range to a different range determined by the wavelength range of transparency of and wavelength-sensitive anti-reflection coatings on the optical components of the testing system and the test lens system.

Bragg cells are presently available commercially in a range from about $10\mu$ in the IR to about 2000A in the UV. Optical beam splitters and lenses are similarly available over this wide range of the optical spectrum. Optical and electronic detector components are available throughout this spectrum with sufficient sensitivity and response time. Bandwidths up to tens of Mc would typically be needed. In the IR bands of $3-5\mu$ and $8-12\mu$, which are in atmospheric windows, presently available detectors would require cooling. Examples of useful detectors include, for example, lead sulfide, lead selenide, and indium antimonide in the $3-5\mu$ bands; and the lead tin telluride, mercury cadmium telluride, and mercury- or gold-doped germanium in the $8-12\mu$ band. The real-image forming screens for use at different $\lambda_o$ would probably have to be custom made to meet their exacting requirements.

Although the foregoing description has been directed primarily to the use of a single laser source and a Bragg cell means for acoustically splitting the coherent lasar beam into the two $f_o$ and $f_{o'}$ beams, other means for accomplishing this can be employed. For example, the desired $f_o$ and $f_{o'}$ beams can be obtained by means of two lasers, each producing one of the desired different frequencies when their respective frequencies can be interlocked. Alternatively, a single laser source can be employed to provide separate $f_o$ and $f_{o'}$ beams. A laser usually oscillates at a set of different frequencies simultaneously. These frequencies are determined by the cavity resonances and separated by a frequency $\Delta f = c/2L$, where c is the velocity of the radiation in the laser medium and L is the mirror to mirror optical distance in the lasar cavity. Typical frequency separations of tens or hundreds of Mc result depending on the optical cavity length. Two adjacent lines can be taken out, for example, one each on opposite sides of the laser by using etalon pairs as reflectors tuned to the respective lines, thereby providing the desired separate $f_o$ and $f_{o'}$ beams. Another method to obtain two laser beams with a fixed $\Delta f$ frequency is by using the Doppler shift associated with moving optical components (such as gratings, etc.). A single lasar may also be able to provide different wavelengths within a range determined by the laser, to test the optical wavelength range of a test lens and its chromatic performance.

II. THE TEST PROCEDURES PERFORMED ON THE TEST LENS SYSTEM

The mounting of the test lens and its maneuverability in terms of on- and off-axis test positioning and rotation are state-of-the-art, as are the detector optics and associated analyzing and comparison electronics. These facets of the test apparatus and procedure are, therefore, not considered to be part of the inventive contribution of the invention.

All of the following test procedures, which can be performed with the testing optical system of the invention, are not mandatory but can be individually selected depending on the performance design and requirements of the particular test lens. For reasons of convenience and to avoid unnecessary repetition, discussion of the reference fringe pattern and analyzing slit will be omitted, sinve they have already been described. It will also be understood that conditions of the tests, such as range of fringe period or lines/mm, off-axis angles, etc., are determined by the design parameters of the lens system being tested. 1. The test lens, in a stationary on-axis position, is scanned by employing a target fringe pattern with continuously varying $\lambda_s$ from $\infty$ to a predetermined finite value to produce a continuously varying fringe density in terms of lines/mm. Comparison of the test and reference AC/DC signal ratios and AC signal phases gives the MTF and PTF of the test lens in this on-axis position. It will be understood that similar comparison of AC/DC contrast ratios and phase can similarly be performed in the test procedures described below. 2. The test lens in the on-axis position is rotated continuously around its optical axis and scanned with a fringe pattern at at least one and preferably at several predetermined dimensions of $\lambda_s$. This test determines the angular symmetry of the test lens. 3. If an unacceptable degree of angular asymmetry is found, the polarization plane of the test radiation is rotated to at least one predetermined angle, e.g., 90°, and the procedure of II(1) is repeated. By means of this test, it can be determined whether the test lens can be oriented in a manner which can provide adequate performance. 4. The test lens is incrementally tilted by tilting its optical axis in the y-z plane around the nodal point to successive predetermined angles $\alpha_1$, $\alpha_2$, etc., through a total arc $\Delta\alpha$ with the optical axis of the lens in the y-z plane. The procedure of II(1) is repeated with the stationary, tilted lens at each $\alpha$ increment. This procedure determines the MTF and PTF characteristics of the test lens at successively increasing radial distances from the center of the object plane as defined by the instantaneous optical axis of the lens. 5. The off-axis test lens is rotated around its optical axis at one or more preselected values of $\alpha$ and the procedure of II(2) is repeated to determine angular symmetry of the test lens in off-axis position. 6. If an unacceptable degree of angular asymmetry is found in the off-axis testing, the polarization procedure of II(3) can be repeated to determine whether the polarization with respect to the lens tilt plane can be acceptably oriented for adequate performance. 7. For test lenses whic have particularly exacting performance requirements, the following tests are performed with the lens in off-axis position:

a. Rotate the test and reference fringe patterns and their respective analyzing slits to an angle between 0° and 180°, preferably 90°, and repeat the procedure of II(1). These test results determine the resolution for two orthogonal patterns of variable spatial frequency targets;

b. With the fringes and slits at the rotated angle, the polarization test described in II(3) can be made. 8. The test lens can be checked for performance at different magnifications from ∞ to zero as desired by positioning a high quality auxiliary lens of known OTF characteristics between the object plane and test lens and moving it back or forth along the z-axis or by moving the test lens in similar manner. Any or all of the aforedescribed test procedures can be performed at any desired test lens magnifications.

By means of the foregoing operations II(1)–(8), any achromatic aberration cam be found which could interfere with the desired imaging performance of the particular test lens. 9. To determine chromatic characteristics of the test lens, any or all of the aforedescribed procedures can be repeated at different wavelengths, the range of which is determined by the design parameters of the test lens and the operating wavelength range of the optical components. The different test wavelengths can be produced by different laser sources, or by the same laser which can produce different, separable wavelengths.

It will be understood that, although the foregoing description has been in terms of a polarized laser source since this is essential if it is desired to determine polarization characteristics of a test lens system, polarization tests are, in fact, optional. In the case of testing apparatus or process employed in applications which do not require polarization tests, the coherent radiation beam produced by the laser need not be polarized.

FIGURES

FIG. 2 is an enlarged diagrammatic illustration of a portion of FIG. 1, without the $f_0-f_{01}$, superimposed beams, showing the object plane, test lens and image plane of the test channel.

FIG. 3 shows the test lens in off-axis position.

DETAILED DESCRIPTION

Figure 1:
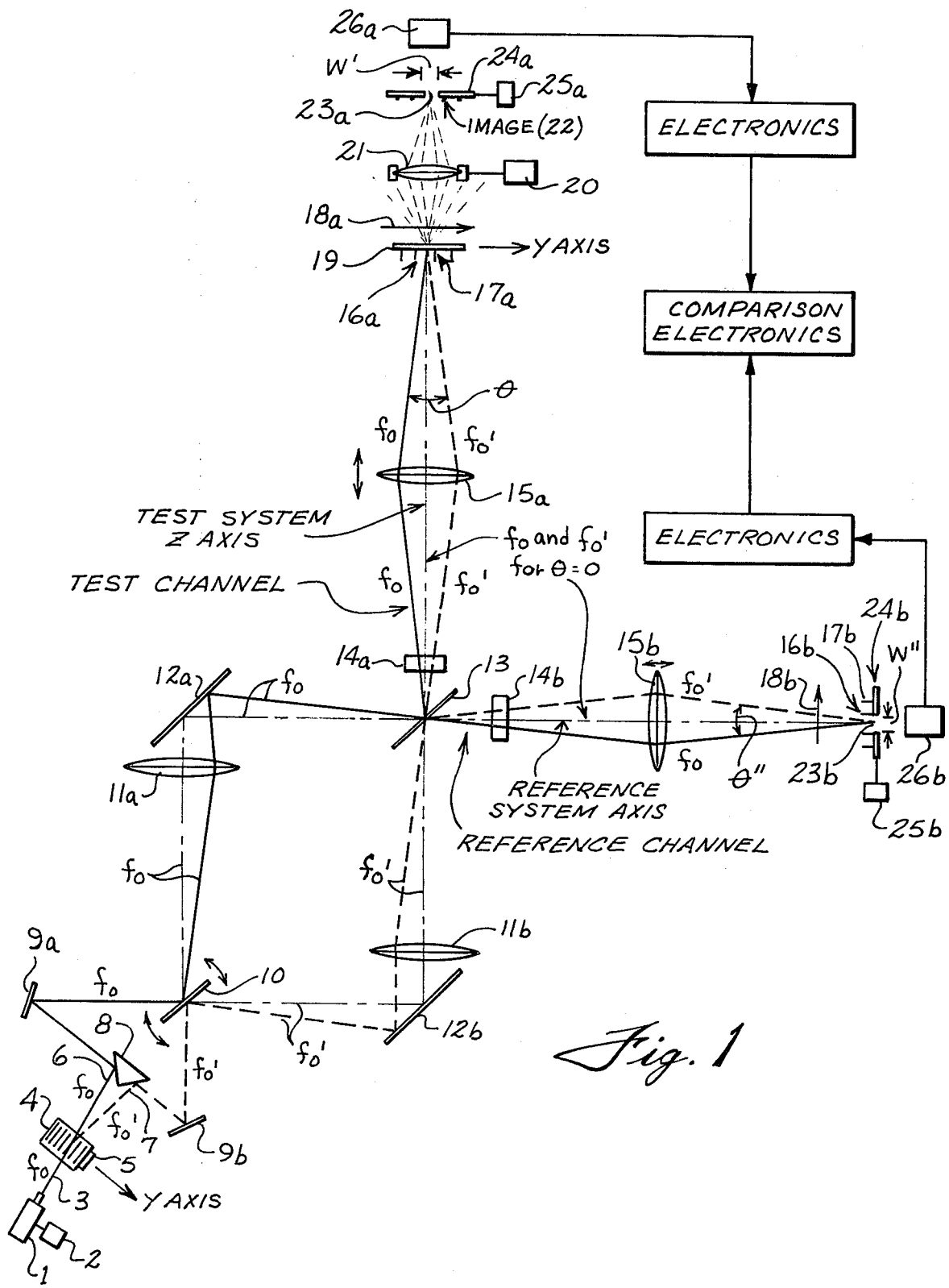
FIG. 1 is a diagrammatic illustration showing an embodiment of an optical system of the invention for implementing the OTF measurement system employing moving-fringe patterns and the coherent light beams and their relationships.

As shown in FIG. 1, laser source 1, with associated means 2 for rotating it around its optical axis, emits coherent radiation beam 3 of frequency $f_o$. Rotation means 2 is optionally employed for rotating the laser through an angle within the range of 0° to 180° when the laser beam is polarized and polarization characteristics of the test lens system is to be tested. Beam 3 enters, at a slight angle, Bragg cell 4 which consists of a transparent medium, such as water or glass, which is compressionally driven by crystal transducer 5 at an imposed oscillation frequency, e.g., 10 to 50Mc, to form acoustic wavelengths $\lambda_a$ in the cell medium. The input laser beam is divided into two coherent radiation beams of the same size, intensity and polarity, one beam 6 being nondiffracted and having the original $f_o$ frequency, and the other beam 7 being diffracted and acoustically modified into having slightly shifted frequency $f_{o,}$. The difference in frequency $\Delta f$ is the Bragg cell acoustic frequency which is within the radio frequency range.

The diverging $f_o$ and $f_{o'}$, beams are further symmetrically diverged by conventional optical means, such as a rooftop type of front surface mirror 8, and then symmetrically converged by front-surface mirrors 9a and 9b onto double-mirror-surfaced mirror 10, beam $f_o$ being incident on one of the mirrored surfaces and beam $f_{o'}$, being incident on the opposite mirrored surface. Mirror 10 can be rotated around an axis which is perpendicular to the paper through an angle of ±45°, as shown, to change equally the angle of incidence and reflection of beam $f_o$ and $f_{o'}$, respectively. For purposes of convenience, the $f_o$ and $f_{o'}$, beams at two different mirror 10 angles are shown. The two illustrated pairs of $f_o$ and $f_{o'}$, beams are shown being reflected and transmitted by means of an optical system comprising identical front surface mirrors 12a and 12b and converging lenses 11a and 11b. The $f_0$ and $f_{01}$, beams which pass respectively through the optical axes of lenses 11a and 11b are additionally identified as the system axes since their pair will converge at $\theta$ = zero. Incremental or continuous rotation of mirror 10 changes the fringe period of the moving-fringe target and reference patterns, incrementally or continuously, through a wide range from infinity in the case of $\theta$ = zero to a very small fringe period (spatial frequency or lines/mm from zero to a maximum value in the case of $\theta$ and $\theta'$ = maximum) with the assistance of the divergence of beams $f_o$ and $f_{o'}$, provided by element 10 and its associated lens and mirror system.

Figure 2A:
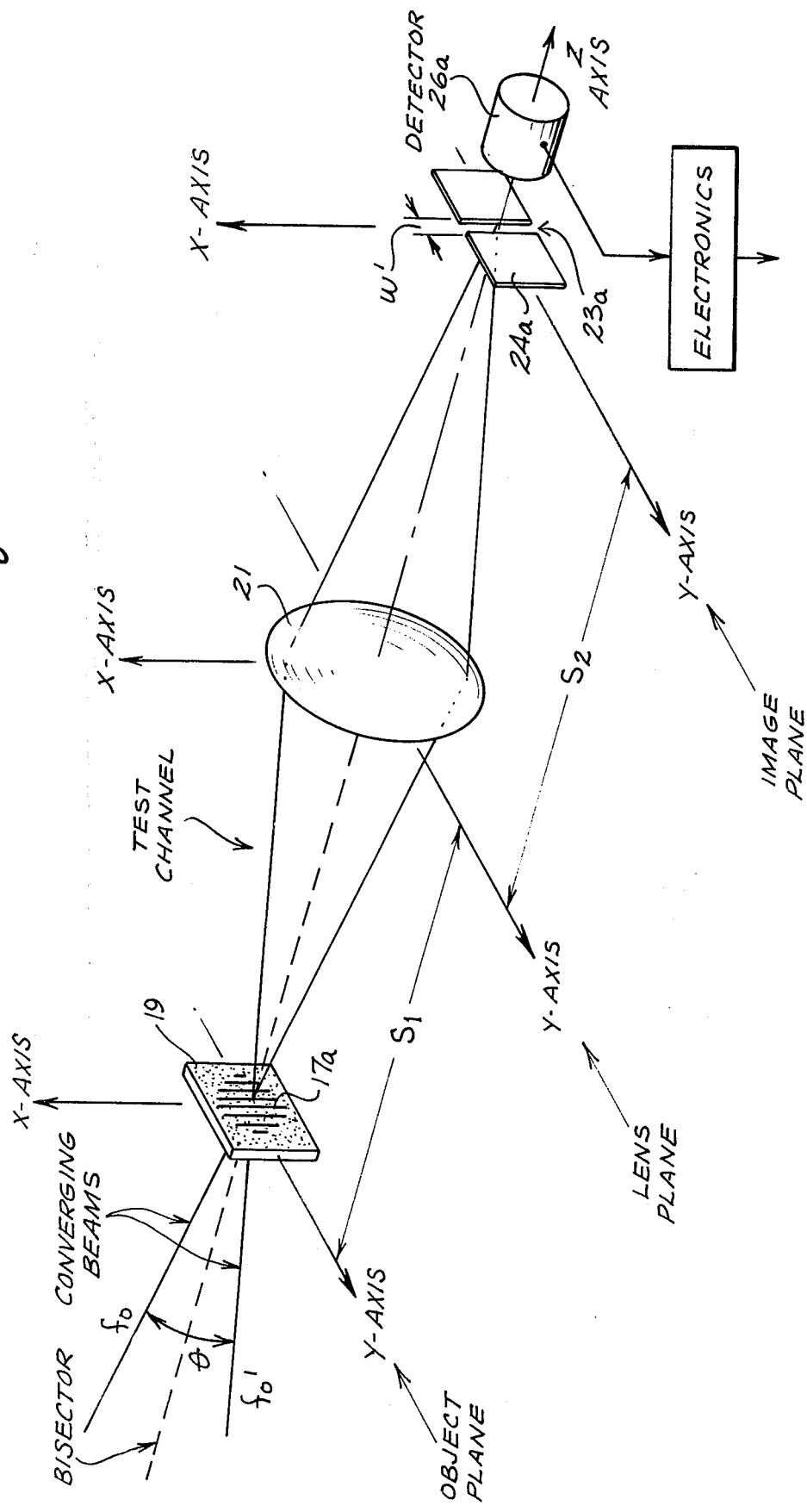
FIG. 2A is a diagrammatic three-dimensional plan view.

Identical front-surface mirror pair 12a and 12b converge the $f_o$ and $f_{o'}$, beams onto beam splitter 13, which, by 50 percent transmission and reflection, divides each beam into two beams of equal size, intensity, frequency and polarity. The two resulting $f_o$ and $f_{o'}$, beam pairs form the test and reference channels respectively. Identical image rotators 14a and 14b are rotatable around the optical axes of the test and reference channels through an angle of 0° to 180° and are optionally employed for rotation of the test and reference fringe patterns. The rotator means can be any conventional mirror or prism means which can receive two beams of light, rotate their plane and transmit them otherwise unchanged. Examples include but are not limited to mirrors or prisms such as the Dove, Abbe, Taylor, Schmidt and Uppendahl optical devices, sometimes referred to as image rotators. Convex lenses 15a and 15b converge the test and reference beam pairs to form, at cross-over zones, moving fringe patterns 16a and 16b at respective angles $\theta$ and $\theta''$. Within the zones of convergence, the patterns consist of laterally-moving, alternately dark and light interference fringes 17a and 17b, shown out of proportion in FIG. 1. The test channel fringe pattern 17a is more clearly shown in enlarged detail in FIGS. 2 and 2A. The fringes move in the direction shown by arrows 18a and 18b at a rate equal to $\Delta f$. FIGS. 1 and 2 show the relative positions of the y and z axes, which lie in the plane of the paper. FIG. 2A additionally shows the direction of the x-axis. The bisectors of the two converging $f_0$ and $f_{01}$, beam pairs lie along the optical axes of the test and reference channels; the normals to the fringe planes (y-axis) are perpendicular to the converging beam bisectors (z-axis) in the test channel; the fringe planes are parallel to the x–z plane; and the fringes move in the y-direction.

The test channel fringe pattern 17a is formed in the object plane. The real-image-forming plate 19 is positioned across fringe pattern 17a in the x–y plane and held in place by adjustable means not shown. The scattering centers are on the downstream face of plate 19. The real-image former scatters the incident fringe pattern illumination, thereby forming a real image of the moving-fringe pattern in the object plane. The radiation is scattered in essentially a Lambertian distribution. Radiation from the real-image fringe pattern is received by test lens 21 (shown in FIGS. 1, 2 and 2A on-axis) which reforms it as an image 22 in the image plane. As shown, magnification is unity. Test lens 21 can be adjusted in position, rotated around its optical axis, or tilted around its nodal point by conventional means 20.

A narrow slit 23a in slit plate 24a is positioned in the test channel in the image plane of the test lens, by means not shown, in such manner that the longitudinal axis of the slit is parallel to the fringe planes and the slit plate lies in the x–y plane. Preferably associated with the slit plate is means 25a for adjusting the position of the slit and varying the width $w'$ of the slit. Radiation transmitted through analyzer slit 23a is received by detector 26a and associated electronics, which separate the test radiation into AC and DC signal components, compute the AC/DC ratios, and sense the phase of the AC test signal.

In the reference channel moving-fringe pattern 16b having the same $\lambda_s$ as 16a is analyzed by slit 23b in plate 24b positioned in the same way with respect to the reference fringe pattern as slit 23a and slit plate 24a in the test channel. Slit 23b as shown is identical with slit 23a in width $w''$ size, orientation and adjustability. Means 25b is provided for the desired adjustability. It will be understood, however, that with test lens magnifications other than unity, the width of slit 23a must be adjusted proportionally to the change in image size. Radiation transmitted through slit 23b is received by sensitive detector 26b and associated electronics, which separate the reference radiation into AC and DC signal components, compute the AC/DC ratios, and sense the phase of the AC reference signal. The test and reference AC/DC ratios and AC phases are then compared by appropriate conventional electronics.

In a lens test procedure wherein rotation means 14a and 14b are used to rotate and reference channel fringe patterns, scanning slits 23a and 23b must be rotated through the same angle as the fringe pattern to maintain the required relative orientation as aforedescribed.

It should be noted that because of the scattering produced by the real-image forming plate 19, total illumination in terms of AC and DC radiation received by the test lens is reduced. The AC/DC ratio and the AC signal phase, however, remain unchanged and, in the case of a perfect (diffraction-limited) test lens, would compare to the reference channel values.

In the embodiment illustrated in FIG. 1, incremental or continuous change in angle $\theta$ which, as aforedescribed, changes the spatial frequency or line density of the real-image fringe pattern target in the object plane, is accomplished by double-sided mirror 10. To provide an angle $\theta$ equal to zero (and corresponding $\lambda_s$ equal to infinity), the mirror 10 is positioned in such manner as to converge the initial $f_o$ and $f_{o'}$, beams onto beam splitter 14 at an angle such that the $f_o$ and $f_{o'}$, beam components of the test and reference pairs respectively become superimposed with $\theta$ and $\theta''$ equalling zero and coincident respectively with the optical axes of the test and reference channels.

In FIG. 3, the test lens system is shown off-axis with the z-axis of the system passing through its nodal point 27 and its optical axis 28 at an angle $\alpha$ to the z-axis.

Figure 4:
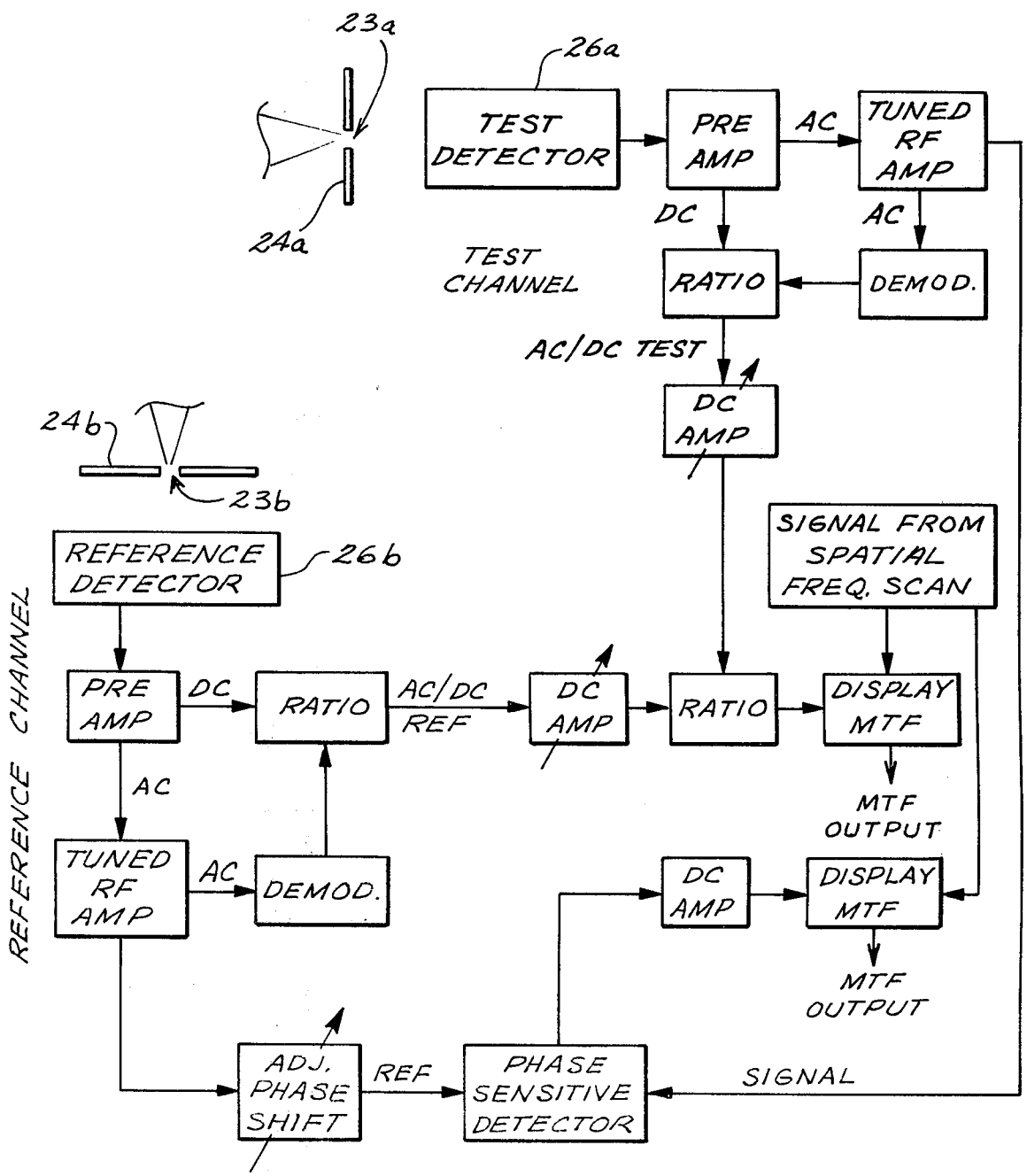
FIG. 4 is a schematic illustration of components which can be used in the detection and data analyzing electronics parts of the system.

The detectors and electronics associated with the test and reference channels are within the state of the art and, therefore, do not require detailed description. An illustrative type is shown in FIG. 4. The electronics associated with the test channel detector and the reference channel detector, which preferably are photomultiplier tubes 26a and 26b, each equipped with a narrow-band interference filter having maximum transmission at the particular operating wavelength $\lambda_o$, are essentially the same and include components for separating the signals into AC and DC components, amplifying, rectifying and filtering them, and then determining respectively the AC/DC ratios of the test and reference channel AC and DC components. The final stage of the electronics then compares the test and reference AC/DC values. The output of this final ratio-taking circuit can then be displayed against the instantaneous value of fringe period as the MTF of the lens under test. The instantaneous value of the fringe period can be monitored, for example, by recording the angular position of the angularly-rotatable, fringe period-varying element 10. The PTF of the test lens can simultaneously be monitored by passing the AC test signal and the AC reference signal into appropriate phase detector and comparison electronics. In the case of both MTF and PTF testing, the output can be passed to a data acquisition system, which can be employed to produce visual displays or recordings.

For flexibility and for being able to normalize the signals to unity, e.g., at zero spatial frequency, DC amplifiers with variable gain may be included in the MTF section of the electronics and variable phase shifters operating at the RF Bragg cell frequency can be included in the PTF section of a complete OTF system.

It will be understood that various mechanical stabilizers and noise-reducing elements and different optical and electronics means known to the art can be employed to practice the invention.

Although this invention has been described with reference to illustrative embodiments thereof, it will be apparent to those skilled in the art that the principles of this invention can be embodied in other forms but within the scope of the claims.

I claim:

1. In apparatus for testing the optical transfer function of a lens, comprising a radiation source; object-forming means in the object plane of the test lens, said object-forming means having a spatial-frequency which is adapted to being incrementally or continuously changed; adjustable mounting means for the test lens in the test channel; slit means for analyzing the image formed by the test lens; a reference channel; an detector means with associated electronics for measuring and comparing the modulation transfer function of the test lens and reference channel systems, the improvement comprising:
   1. means for forming a moving-fringe interference pattern in the object plane of the test lens in the test channel, said means for forming said pattern comprising two converging, monochromatic, coherent-radiation beams of substantially the same intensity and size and respectively different frequencies $f_o$ and $f_{o'}$, the difference in frequency $\Delta f$ being in the ratio frequency range;
   2. means for changing the fringe period $\lambda_s$ of said pattern equally and simultaneously in the range from infinity to a finite $\lambda_s$ determined by the design characteristics of the test lens;
   3. means positioned across the $x$–$y$ plane of said fringe pattern for forming said pattern into a real-image target for said test lens in the object plane;
   4. slit means positionable in the image plane of said test lens and, thereby, in the reimaged fringe pattern formed by said test lens in the test channel, said slit means being characterized by:
      a. being positionable in such manner that its longitudinal axis is parallel to the reimaged fringe pattern planes;
      b. being in a slit element positionable in the $x$–$y$ plane of said reimaged fringe pattern and having a width $W'$ adapted to being within the following relationship:
      $$2\lambda_o \quad W' \quad 0.5\lambda'_s$$
      wherein $\lambda_o$ is the radiation wavelength and $\lambda'_s$ is the smallest fringe period of said reimaged fringe pattern produced with said test lens;
   5. detector means and associated electronics positionable downstream of said slit means for detecting the radiation transmitted by the slit, separating the AC and DC signal components of the transmitted radiation, and determining the AC/DC ratio of said signal components;
   6. a reference channel comprising means for producing an AC/DC ratio equivalent to the AC/DC ratio producible by the movingfringe pattern in the object plane of the test lens in the test channel; and
   7. means for comparing the AC/DC ratios produced by the reimaged fringe pattern in the test channel and the AC/DC ratios produced by the reference channel.

2. In apparatus for testing the optical transfer function of a lens, comprising a radiation source; object-forming means in the object plane of the test lens, said object-forming means having a spatial-frequency which is adapted to being incrementally or continuously changed; adjustable mounting means for the test lens in the test channel; slit means for analyzing the image formed by the test lens; a reference channel; and detector means with associated electronics for measuring and comparing the modulation transfer function of the test lens and reference channel systems, the improvement comprising:
   1. means for forming a first moving-fringe interference pattern in the object plane of the test lens in the test channel and a second moving-fringe interference pattern in the reference channel, said first and second fringe patterns having respective fringe periods $\lambda_s$ and $\lambda_s''$ said means for forming each of said first and second patterns comprising two converging, monochromatic, coherent-radiation beams of substantially the same intensity and size and respectively different frequencies $f_o$ and $f_{o'}$, the difference in frequency $\Delta f$ being in the radio frequency range;
   2. means for continuously changing the fringe period of both said first and second patterns simultaneously in the range from infinity to a finite fringe period determined by the design characteristics of the test lens;
   3. means positioned across the $x$–$y$ plane of said first fringe pattern for forming said pattern into a real-image target in the object plane;
   4. first slit means positionable in the image plane of the test lens and, thereby, in the reimaged fringe pattern formed by the test lens, said first slit means being characterized by:
      a. being positionable in such manner that its longitudinal axis is parallel to the fringe planes of the reimaged fringe pattern;
      b. being in a slit element positionable in the $x$–$y$ plane of said reimaged fringe pattern; and
      c. having a width $W'$ adapted to being within the following relationship:
      $$2\lambda_o \quad W' \quad 0.5\lambda'_s$$
      wherein $\lambda_o$ is the radiation wavelength and $\lambda'_s$ is the smallest reimaged fringe period produced by said test lens;
   5. second slit means positionable in said second moving-fringe pattern in the reference channel, said second slit means being characterized by:
      a. being positionable in such manner that its longitudinal axis is parallel to the fringe planes of said second fringe pattern;
      b. being in a slit element positionable in the $x$–$y$ plane of said second fringe pattern; and
      c. having a width $W''$ adapted to being within the following relationship:

$$2\lambda_o \quad W'' \quad 0.5\lambda''_s$$

wherein $\lambda''_s$ is the smallest fringe period produced by said second fringe pattern;

6. detector means and associated electronics positionable downstream of said first slit means for detecting the radiation transmitted by the slit; separating the AC and DC signal components of the transmitted radiation; and determining the AC/DC ratio of said signal components;

7. detector means and associated electronics positionable downstream of said second slit means for detecting the radiation transmitted by the slit; separating the AC and DC signal components of the transmitted radiation; and determining the AC/DC ratio of said signal components;

8. means for comparing the AC/DC ratios produced by the reimaged fringe pattern in the test channel and the AC/DC ratios produced by the reference channel.

3. The apparatus of claim 2 wherein the test lens is associated with means for rotating and/or tilting the lens.

4. The apparatus of claim 2 wherein the detector means and associated electronics include means for comparing the phase of the AC signal produced by the test channel and the AC signal produced by the reference channel.

5. The apparatus of claim 3 wherein the detector means and associated electronics include means for comparing the phase of the AC signal produced by the test channel and the AC signal produced by the reference channel.

6. The apparatus of claim 3 which includes means for incrementally changing the fringe period of both said first and second fringe patterns.

7. The apparatus of claim 5 which includes means for incrementally changing the fringe period of both said first and second fringe patterns.

8. The apparatus of claim 3 which includes means for rotating said first and second fringe patterns through the same angle from 0° to 180° and means for rotating said first and second slit means through the same angle as said fringe patterns.

9. The apparatus of claim 5 which includes means for rotating said first and second fringe patterns through the same angle from 0° to 180° and means for rotating said first and second slit means through the same angle as said fringe patterns.

10. The apparatus of claim 6 which includes means for rotating said first and second fringe patterns through the same angle from 0° to 180° and means for rotating said first and second slit means through the same angle as said fringe patterns.

11. The apparatus of claim 7 which includes means for rotating said first and second fringe patterns through the same angle from 0° to 180° and means for rotating said first and second slit means through the same angle as said fringe patterns.

12. The apparatus of claim 3 which includes means for equally polarizing said coherent-radiation beams and means for rotating the polarization means through an angle from 0° to 180°.

13. The apparatus of claim 5 which includes means for equally polarizing said coherent-radiation beams and means for rotating the polarization means through an angle from 0° to 180°.

14. The apparatus of claim 6 which includes means for equally polarizing said coherent-radiation beams and means for rotating the polarization means through an angle from 0° to 180°.

15. The apparatus of claim 7 which includes means for equally polarizing said coherent-radiation beams and means for rotating the polarization means through an angle from 0° to 180°.

16. The apparatus of claim 8 which includes means for equally polarizing said coherent-radiation beams and means for rotating the polarization means through an angle from 0° to 180°.

17. The apparatus of claim 9 which includes means for equally polarizing said coherent-radiation beams and means for rotating the polarization means through an angle from 0° to 180°.

18. The apparatus of claim 10 which includes means for equally polarizing said coherent-radiation beams and means for rotating the polarization means through an angle from 0° to 180°.

19. The apparatus of claim 11 which includes means for equally polarizing said coherent-radiation beams and means for rotating the polarization means through an angle from 0° to 180°.

20. The apparatus of claim 2 wherein said first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverge said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

21. The apparatus of claim 3 wherein said first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverge said beams at an angle determined by the angle of rotation of said rotatable optical means;
3. means for converging said pair of diverging $f_o$ and $f_{o'}$ beams onto a second beam splitter adapted to divide said $f_o$ and f · beams equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

22. The apparatus of claim 4 wherein said first and second moving-fringe patterns are formed by means comprising:
1. means for producing a pair of coherent-radiation beams of substantially same size, intensity, and said different frequencies $f_o$ and $f_{o'}$, 2. means for first diverging and then converging said pair of $f_o$ and $f_{o'}$ beams onto a rotatable optical means adapted to diverage said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

23. The apparatus of claim 5 wherein siad first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverge said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

24. The apparatus of claim 6 wherein said first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverge said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

25. The apparatus of claim 7 wherein said first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverage said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

26. The apparatus of claim 11 wherein said first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverge said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

27. The apparatus of claim 19 wherein said first and second moving-fringe patterns are formed by means comprising:
1. means for producing a pair of coherent-radiation beams of substantially same size, intensity, and said different frequencies $f_o$ and $f_{o'}$,
2. means for first diverging and then converging said pair of $f_o$ and $f_{o'}$ beams onto a rotatable optical means adapted to diverge said beams at an angle determined by the angle of rotation of said rotatable optical means;
3. means for converging said pair of diverging $f_o$ and $f_{o'}$ beams onto a second beam splitter adapted to divide said $f_o$ and $f_{o'}$ beams substantially equally into a first $f_o$ and $f_{o'}$ beam pair adapted to form the test channel and a second $f_o$ and $f_{o'}$ beam pair adapted to form the reference channel; and
4. means for converging said first and second beam pairs to form said first and second moving-fringe patterns.

28. The apparatus of claim 1 wherein width W' of the slit means is adapted to being within the following relationship:
$$2 \lambda_o < W' << 0.5 \lambda'_s.$$

29. The apparatus of claim 2 wherein width W' of the first slit means is adapted to being within the following relationship:
$$2 \lambda_o < W' << 0.5 \lambda'_s,$$
and width W'' of the second slit means is adapted to being within the following relationship:
$$2 \lambda_o < W'' << 0.5 \lambda''_s.$$

30. The apparatus of claim 3 wherein width W' of the first slit means is adapted to being within the following relationship:
$$2 \lambda_o < W' << 0.5 \lambda'_s,$$
and width W'' of the second slit means is adapted to being within the following relationship:
$$2 \lambda_o < W'' << 0.5 \lambda''_s.$$

31. The apparatus of claim 4 wherein width W' of the first slit means is adapted to being within the following relationship:
$$2 \lambda_o < W' << 0.5 \lambda'_s,$$

and width $W''$ of the second slit means is adapted to being within the following relationship:
$$2\lambda_o < W'' << 0.5 \lambda''_s.$$

32. The apparatus of claim 5 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

33. The apparatus of claim 6 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

34. The apparatus of claim 7 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

35. The apparatus of claim 8 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

36. The apparatus of claim 9 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

37. The apparatus of claim 10 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

38. The apparatus of claim 11 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

39. The apparatus of claim 20 wherein width $W'$ of the first slit means is adapted to being within the following relationship:
$$2\lambda_o < W' << 0.5 \lambda'_s,$$
and width $W''$ of the second slit means is adapted to being within the following relationship:
$$2\lambda_o < W'' << 0.5 \lambda''_s.$$

40. In a process for testing the optical transfer function of a lens system, comprising providing a radiation source; providing an object of fixed spatial frequency and an associated device for incrementally or continuously changing said spatial frequency in the object plane; adjustably mounting in the test channel a test lens; analyzing the image formed by the test lens by means of a slit positioned in said image; providing a reference channel; and detecting, measuring, and comparing the modulation transfer function of the test lens and reference channel systems, the impprovement comprising:

1. forming a moving-fringe interference pattern in the object plane of the test lens in the test channel, said fringe pattern being formed by converging two monochromatic, coherent-radiation beams of substantially same intensity and size and different frequency $f_o$ and $f_{o'}$, the difference in frequency $\Delta f$ being in the radio frequency range;
2. incrementally or continuously changing the fringe period of said fringe pattern in the range from infinity to a finite $\lambda_s$ determined by the design characteristics of the test lens;
3. positioning a real-image former across the $x$–$y$ plane of said fringe pattern, thereby forming said pattern into a real-image target;
4. positioning the test lens downstream of the object plane;
5. positioning a slit element having a slit in the image plane of the test lens and, thereby, in the reimaged fringe pattern formed by the test lens, said slit being characterized by:
   a. being positioned in such manner that its longitudinal axis is parallel to the fringe planes of the reimaged fringe pattern;
   b. being in a slit element positioned in the $x$–$y$ plane of said reimaged fringe pattern; and
   c. having a width $W'$ within the following relationship:
   $$2\lambda_o \quad W' \quad 0.5 \lambda'_s,$$
   wherein $\lambda_o$ is the radiation wavelength and $\lambda'_s$ is the smallest reimaged fringe period produced by said test lens;
6. continuously determining the AC/DC ratio produced by a reference channel, said reference channel producing an AC/DC ratio equivalent to that prodicible by the moving-fringe pattern in the object plane of the test lens in the test channel; and
7. continuously comparing the AC/DC ratios produced by the reference channel.

41. In a process for testing the optical transfer function of a lens system, comprising providing a radiation source; providing an object of fixed spatial frequency and an associated device for incrementally or continuously changing said spatial frequency in the object plane; adjustably mounting in the test channel a test lens; analyzing the image formed by the test lens by means of a slit positioned in said image; providing a reference channel; and detecting, measuring, and comparing the modulation transfer function of the test lens and reference channel systems, the improvement comprising:

1. forming a first moving-fringe interference pattern in the object plane of the test lens in the test channel and a second moving-fringe interference pattern in the reference channel, said first and second fringe patterns having respectively fringe periods $\lambda_s$ and $\lambda''_s$, each of said first and second fringe patterns being formed by converging two monochromatic, coherent-radiation beams of substantially same intensity and size and different frequency $f_o$ and $f_{o'}$, the difference in frequency $\Delta f$ being in the radio frequency range;
2. incrementally or continuously changing the fringe period of both of said first and second fringe patterns simultaneously in the range of infinity to a finite fringe period determined by the design characteristics of the test lens;
3. positioning a real-image former across the $x$–$y$ plane of said first fringe pattern, thereby forming said pattern into a real-image target;

4. positioning the test lens downstream of the object plane;
5. positioning a first slit element having a firt slit in the image plane of the test lens and, thereby, in the reimaged fringe pattern formed by the test lens, said first slit being characterized by:
   a. being positioned in such manner that its longitudinal axis is parallel to the fringe planes of the reimaged fringe pattern;
   b. being in a slit element positioned in the $x$–$y$ plane of said reimaged fringe pattern; and
   c. having a width $W'$ within the following relationship:
   $$2\lambda_o \quad W' \quad 0.5 \lambda'_s,$$
   wherein $\lambda_o$ is the radiation wavelength and $\lambda'_s$ is the smallest reimaged fringe period produced by said test lens;
6. positioning a second slit element having a second slit in said second moving-fringe pattern, said second slit being characterized by:
   a. being positioned in such manner that its longitudinal axis is parallel to the fringe planes of said second fringe pattern;
   b. being in a slit element positioned in the $x$–$y$ plane of said second fringe pattern; and
   c. having a width $W''$ within the following relationship:
   $$2\lambda_o \quad W'' \quad .05 \lambda''_s,$$
   wherein $\lambda''_s$ is the smallest fringe period produced by said second fringe pattern; and
7. continuously determining and comparing the ratio of the AC to DC signal components of the radiation transmitted through each of said first and second slits.

42. The process of claim 41 wherein the test lens is rotatable and/or tiltable.

43. The process of claim 41 which includes continuously determining and comparing the phase of the AC signal of the radiation transmitted through each of said first and second slits.

44. The process of claim 42 which includes continuously determining and comparing the phase of the AC signal of the radiation transmitted through each of said first and second slits.

45. The process of claim 42 which includes the additional steps comprising:
1. rotating said first and second fringe patterns equally through an angle from 0° to 180°;
2. rotating said first and second slit through the same angle as said fringe patterns; and
3. continuously determining and comparing the ratio of the AC to DC signal components of the scattered radiation transmitted through each of said first and second slits.

46. The process of claim 44 which includes the additional steps comprising:
1. rotating said first and second fringe patterns equally through an angle from 0° to 180°;
2. rotating said first and second slit through the same angle as said fringe patterns; and
3. continuously determining and comparing the ratio of the AC to DC signal components of the scattered radiation transmitted through each of said first and second slits.

47. The process of claim 42 wherein said coherent-radiation beams are equally polarized and said process includes the steps of:
1. rotating the source of the polarized beams through an angle from 0° to 180°, and
2. continuously determining and comparing the ratio of the AC to DC signal components of the scattered radiation transmitted through each of said first and second slits.

48. The process of claim 44 wherein said coherent-radiation beams are equally polarized and said process includes the steps of:
1. rotating the source of the polarized beams through an angle from 0° to 180°, and
2. continuously determining and comparing the ratio of the AC to DC signal components of the scattered radiation transmitted through each of said first and second slits.

49. The process of claim 45 wherein said coherent-radiation beams are equally polarized and said process includes the steps of:
1. rotating the source of the polarized beams through an angle from 0° to 180°, and
2. continuously determining and comparing the ratio of the AC to DC signal components of the scattered radiation transmitted through each of said first and second slits.

50. The process of claim 46 wherein said coherent-radiation beams are equally polarized and said process includes the steps of:
1. rotating the source of the polarized beams through an angle from 0° to 180°, and
2. continuously determining and comparing the ratio of the AC to DC signal components of the scattered radiation transmitted through each of said first and second slits.

51. The process of claim 41 wherein said first and second moving fringe patterns are formed by:
1. producing a pair of coherent-radiation beams of substantially same size, intensity and said different frequencies $f_o$ and $f_{o'}$;
2. first diverging and then converging said pair of $f_o$ and $f_{o'}$ beams onto a rotatable optical means which diverges said beams at an angle determined by the angle of rotation of said rotatable optical means;
3. converging said pair of diverging $f_o$ and $f_{o'}$ beams;
4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
5. converging said first and second beam pairs to form said first and second moving-fringe patterns.

52. The process of claim 42 wherein said first and second moving fringe patterns are formed by:
1. producing a pair of coherent-radiation beams of substantially same size, intensity and said different frequencies $f_o$ and $f_{o'}$;
2. first diverging and then converging said pair of $f_o$ and $f_{o'}$ beams onto a rotatable optical means which diverges said beams at an angle determined by the angle of rotation of said rotatable optical means;
3. converging said pair of diverging $f_o$ and $f_{o'}$ beams;
4. dividing said converged pair of $f_o$ and $f_{o'}$ beams substantially equal into a first $f_o$ and $f_{o'}$ beam pair which forms the test channel and a second $f_o$ and $f_{o'}$ pair which forms the reference channel; and 5. converging said first and second beam pairs to form said first and second moving-fringe patterns.

53. The process of claim 43 wherein said first and second moving fringe patterns are formed by:
   1. producing a pair of coherent-radiation beams of substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by an angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

54. The process of claim 44 wherein said first and second moving fringe patterns are formed by:
   1. producing a pair of coherent-radiation beams of substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by the angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

55. The process of claim 45 wherein said first and second moving fringe patterns are formed by:
   1. producing a pair of coherent-radiation beams of substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by the angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

56. The process of claim 47 wherein said first and second moving fringe patterns are formed by:
   1. producing a pair of coherent-radiation beams of substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by the angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

57. The process of claim 48 wherein said first and second moving fringe patterns are formed by:
   1. producing a pair of coherent-radiation beams of substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by the angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

58. The process of claim 49 wherein said first and second moving fringe patterns are formed by:
   1. producing a pair of coherent-radiation beams of substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by the angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

59. The process of claim 50 wherein said first and second moving fringe patterns are formed by:
   1. producing a pair of coherent-radiation beams of the substantially same size, intensity and said different frequencies $f_o$ and $f_{o'}$ ;
   2. first diverging and then converging said pair of $f_o$ and $f_{o'}$ beams onto a rotatable optical means which diverges said beams at an angle determined by the angle of rotation of said rotatable optical means;
   3. converging said pair of diverging $f_o$ and $f_{o'}$ beams;
   4. dividing said converged pair of $f_o$ and $f_{o'}$ beams substantially equally into a first $f_o$ and $f_{o'}$ beam pair which forms the test channel and a second $f_o$ and $f_{o'}$ pair which forms the reference channel; and
   5. converging said first and second beam pairs to form said first and second moving-fringe patterns.

60. The process of claim 40 wherein width W' of the slit is within the following relationship:
$$2\lambda_o < W' << 0.5 \lambda'_s.$$

61. The process of claim 41 wherein width W' of the first slit is within the following relationship:
$$2\lambda_o < W' << 0.5 \lambda'_s,$$
and width W'' of the second slit is within the following relationship:
$$2\lambda_o < W'' << 0.5 \lambda''_s.$$

62. The process of claim 42 wherein width W' of the first slit is within the following relationship:
$$2\lambda_o < W' << 0.5 \lambda'_s,$$
and width W'' of the second slit is within the following relationship:
$$2\lambda_o < W'' << 0.5 \lambda''_s.$$

63. The process of claim 43 wherein width W' of the first slit is within the following relationship:
$$2\lambda_o < W' << 0.5 \lambda'_s,$$
and width W'' of the second slit is within the following relationship:
$$2\lambda_o < W'' << 0.5 \lambda''_s.$$

64. The process of claim 44 wherein width W' of the first slit is within the following relationship:
$$2\lambda_o < W' << 0.5 \lambda'_s,$$
and width W'' of the second slit is within the following relationship:
$$2\lambda_o < W'' << 0.5 \lambda''_s.$$

65. The process of claim 45 wherein width W' of the first slit is within the following relationship:
$$2\lambda_o < W' << 0.5 \lambda'_s,$$
and width W'' of the second slit is within the following relationship:
$$2\lambda_o < W'' << 0.5 \lambda''_s.$$

66. The process of claim 51 wherein width W' of the first slit is within the following relationship:
$$2\lambda_o < W' << 0.5 \lambda'_s,$$
and width W'' of the second slit is within the following relationship:
$$2\lambda_o < W'' << 0.5 \lambda''_s.$$

* * * * *

UNITED STATES PATENT OFFICE
CERTIFICATE OF CORRECTION

Patent No. 3,930,732          Dated    January 6, 1976

Inventor(s)  Sandor Holly

It is certified that error appears in the above-identified patent and that said Letters Patent are hereby corrected as shown below:

Column 2, line 51, change "fring" to --fringe--.

Column 4, line 65, after "of the" insert --second--.

Column 6, line 59, insert --′<-- between "0.05 $\lambda_o$" and "$d_s$" and between "$d_s$" and "0.1 $\lambda_s$".

Column 6, line 6, insert parentheses around "1/fringe period".

Column 6, line 64, insert --′<-- between "$d_s$" and "$h_s$" and "0.1 $\lambda_s$".

Column 7, line 51, insert --′<-- between "2 $h_o$" and "W'" and between "W'" and "0.5 $\lambda_s'$".

Column 8, line 52, insert --′<-- between "2 $\lambda_o$" and "W″" and between "W″" and "0.5 $\lambda_s″$".

Column 10, line 58, change "sinve" to --since--.

Column 11, line 33, change "whic" to --which--.

Column 11, line 55, change "cam" to --can--.

Column 15, line 31, change "an" to --and--.

Claim 1, line 43, change "ratio" to --radio--.

Claim 1, line 62; claim 2, line 55; claim 40, column 22, line 27; claim 41, column 23, line 14; insert --′<-- between "2 $\lambda_o$" and "W'" and between "W'" and "0.5 $\lambda_s'$".

Claim 2, column 17, line 1; claim 41, column 23, line 28; insert --′<-- between "2 $\lambda_o$" and "W″" and between "W″" and ".05 $\lambda_s″$".

Claim 21, line 56, change "f'" to --$f_o'$--.

Claim 23, line 1, change "siad" to --said--.

Signed and Sealed this

Sixth Day of July 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,930,732      Dated 6 January 1976

Inventor(s) Sandor Holly

It is certified that error appears in the above-identified patent and that said Letters Patent are hereby corrected as shown below:

Claim 40, column 22, line 37, after "duced", insert --by the reimaged fringe pattern in the test channel and the AC/DC ratios produced--.

Signed and Sealed this

Twenty-fourth Day of August 1976

[SEAL]

Attest:

RUTH C. MASON  
*Attesting Officer*

C. MARSHALL DANN  
*Commissioner of Patents and Trademarks*